H. B. LEECH.
OIL ENGINE.
APPLICATION FILED MAY 6, 1910.

987,246.

Patented Mar. 21, 1911.
2 SHEETS—SHEET 1.

WITNESSES

INVENTOR

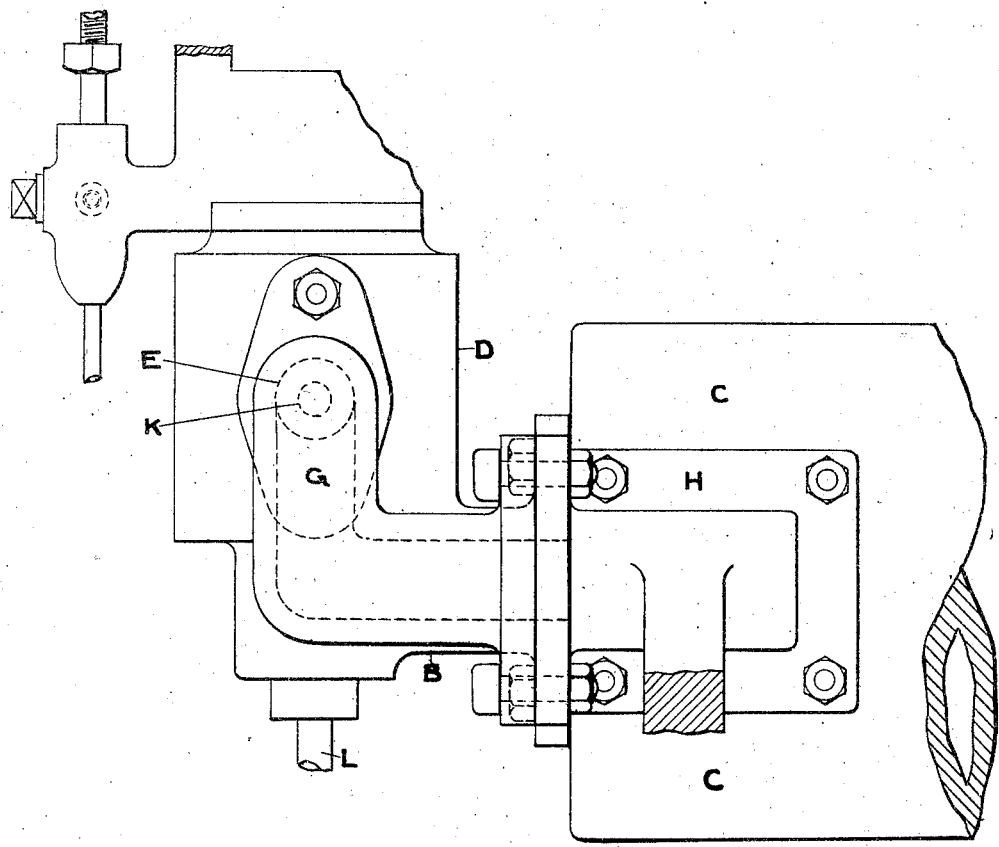

UNITED STATES PATENT OFFICE.

HERMANN BOWYER LEECH, OF HALIFAX, ENGLAND.

OIL-ENGINE.

987,246.

Specification of Letters Patent.    Patented Mar. 21, 1911.

Application filed May 6, 1910. Serial No. 559,839.

*To all whom it may concern:*

Be it known that I, HERMANN BOWYER LEECH, a subject of the King of Great Britain, residing at Halifax, in the county of York, England, have invented new and useful Improvements in and Relating to Oil-Engines, of which the following is a specification.

This invention relates more especially to small power engines using heavy oils, where it is necessary to have a lamp burning continuously in order to keep the vaporizer and ignition tube hot enough to insure a constant or positive ignition.

The object of my invention is to set up an automatic or positive ignition in vaporizers forming part of the combustion chamber, by placing said vaporizer and an ignition tube immediately in the path of the hot gases from the exhaust, and to heat the same by the said gases in their passage to the exhaust outlet pipe. In this manner I am enabled to dispense with the ordinary lamp and ignition after the engine has got fairly started, and so effect a great saving in oil, or the expense of an electric ignition. In connection with my invention I fix the vaporizer and ignition tube at the exhaust end of the cylinder, and surround the said vaporizer with a suitable jacket having an inlet and an outlet. The inlet is connected by pipe with the exhaust, and the outlet to a further pipe connection for conveying the exhaust gases outside. An ignition tube is fixed in the side of the vaporizer and projects into the inlet pipe from the exhaust. I attain these objects by the means illustrated in the accompanying drawings, in which—

Figure 1:
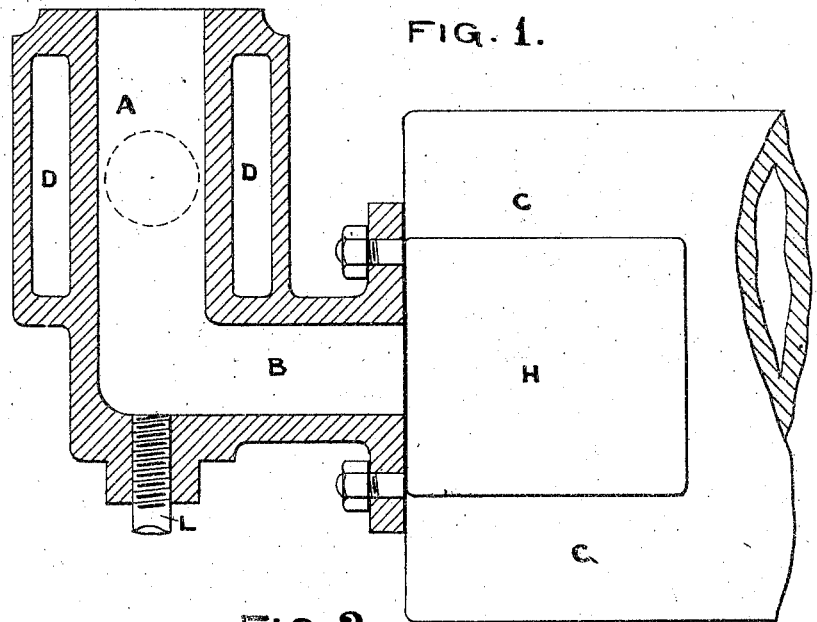
Figure 2:
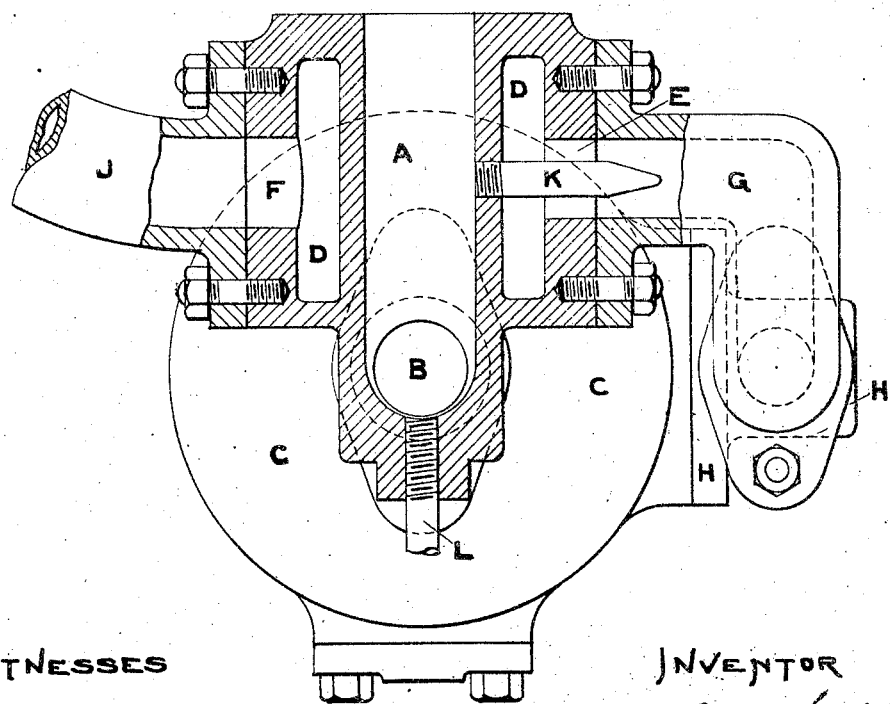

Figure 1 is a sectional side elevation of vaporizer secured to an oil engine cylinder with my improvements applied. Fig. 2 is a sectional end elevation of Fig. 1. Fig. 3 is a side elevation of Fig. 1.

Similar letters refer to similar parts throughout the several views.

The vaporizer A which is also part of the combustion chamber B, is bolted to the exhaust end of the cylinder C and surrounded by a jacket D having an inlet at E and an outlet at F. A pipe G connects the exhaust H with the jacket D, and a further pipe J is bolted to the outlet F for conveying away the exhaust gases. An ignition tube K fixed in the side of the vaporizer A projects into the pipe G.

L is the ordinary ignition tube heated by a lamp in the ordinary way.

When the engine commences running, the hot gases from the exhaust immediately impinge against the tube K and sides of the vaporizer A in their passage to the outlet pipe J, so that once the engine is fairly started in the ordinary way, the hot gases in their passage along the exhaust pipe uniformly heat the ignition tube and vaporizer in such a manner as to set up a positive ignition under varying loads or all conditions of running.

What I claim as my invention and desire to secure by Letters Patent, is—

In an oil engine and in combination, a combustion chamber formed with an exhaust passageway, a vaporizer forming part of the combustion chamber, a jacket surrounding the vaporizer and placed in communication with the exhaust passageway, whereby, the exhaust gases will pass through the jacket, an igniting tube projecting from the side of the vaporizer through the jacket into the exhaust passageway and adapted to be heated by the exhaust gases, and igniting means in the vaporizer independent of the igniting tube heated by the exhaust products.

In testimony whereof I have signed my name to this specification in the presence of two subscribing witnesses.

HERMANN BOWYER LEECH.

Witnesses:
 WM. REED,
 WILFRED ALDERSON.